Jan. 18, 1949.  H. C. FLINT  2,459,758
BACK FOR SEATS
Filed July 10, 1946

INVENTOR
HYLAND C. FLINT

BY  *Ely D. Frye*

ATTORNEYS

Patented Jan. 18, 1949

2,459,758

UNITED STATES PATENT OFFICE 2,459,758

BACK FOR SEATS

Hyland C. Flint, Akron, Ohio, assignor to The Firestone Tire & Rubber Company, Akron, Ohio, a corporation of Ohio Application July 10, 1946, Serial No. 682,687

3 Claims. (Cl. 155—179)

This invention relates to backs for seats, and more especially it relates to seat backs of the diaphragm type whereof the back-rest is supported solely by a rigid marginal frame.

The invention is of especial utility in situations where space is at a premium, as in buses and street cars. By means of the invention it is possible to obtain, in a relatively thin seat back, a soft resilience that is impossible to be attained in seat backs that employ an upholstered sheet metal back-pan.

The chief objects of the invention are to provide a seat back that is relatively thin so as to conserve space; that is comfortable in use; and which has regions of differential resilience so as to provide greater support to local areas of the back of the seat-occupant. Other objects will be manifest as the description proceeds.

Figure 1:
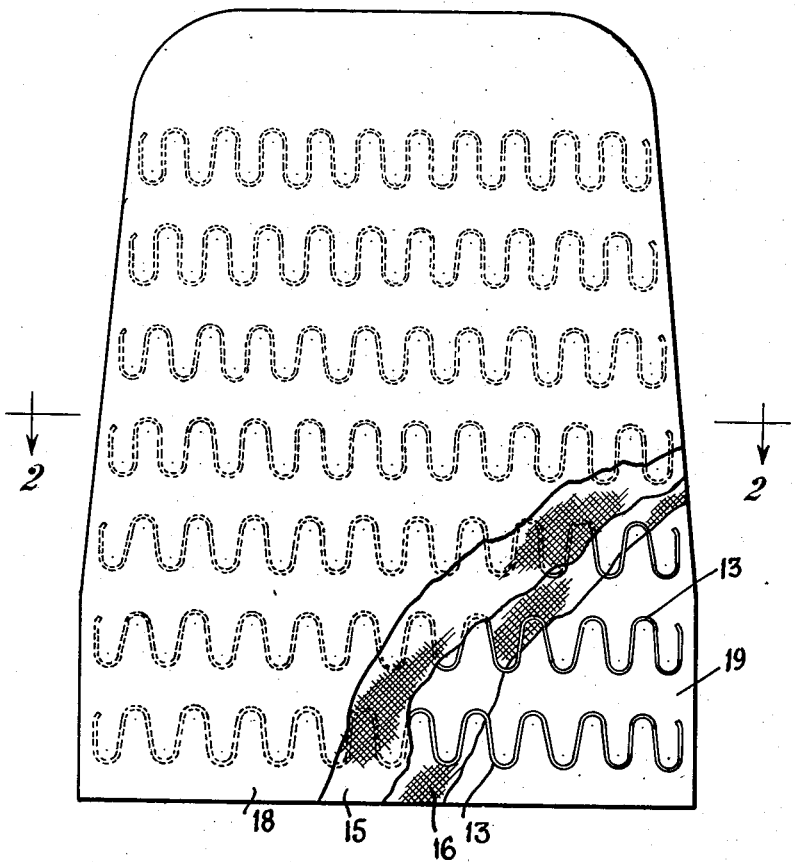
Figure 2:
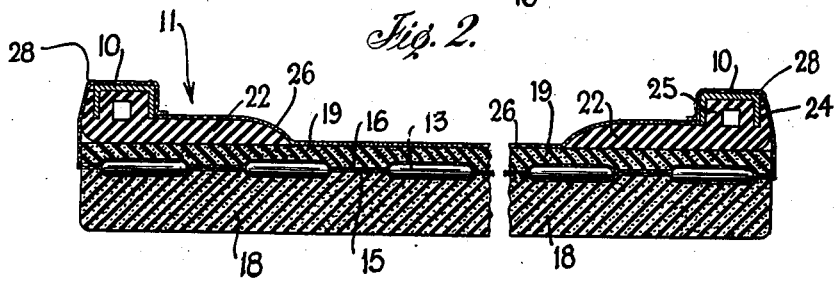

Of the accompanying drawing:

Fig. 1 is a front elevation of a seat back embodying the invention, a part thereof being broken away to reveal underlying structure; and Fig. 2 is a section, on a larger scale, on the line 2—2 of Fig. 1.

Referring now to the drawing, there is shown a seat back that comprises a rigid, open, metal frame 10, and a resilient, diaphragm-like structure, designated as a whole by the numeral 11, that is supported by said frame, the latter having engagement with the margin of said structure 11.

The structure 11 consists essentially of a plurality of flat spring units 13, 13 arranged in parallelism transversely of the structure, and respective layers of resilient composition on opposite sides of said springs. The spring units 13 are of the same general type as the springs of the Kaden Reissue Patent No. 21,263, dated November 14, 1939. Each of said spring units consists of a transversely flat structure made up of a single spring wire bent into a longitudinal succession of undulations or sinuosities. The spring unit differs from that of the Kaden patent aforementioned in that it is tempered while in longitudinally flat condition, and for this reason has no arcuate permanent set. The spring units 13 are retained in determinate position by being confined between two plies of textile fabric 15, 16 of which ply 15 is in front of the spring units and ply 16 is behind the same. The confronting faces of the textile plies 15, 16 are treated with suitable adhesive, preferably comprising rubber, and adhere to the wires of the spring units 13, and to each other between said wires, with the result that the spring units are restrained against movement relatively of each other. The fabric ply 15 is substantially wider than fabric ply 16, and projects beyond the lateral margins of the diaphragm-like structure 11, for a reason presently to be explained. In cases where the seat-back tapers somewhat in width toward the top thereof, as shown herein, the length of the spring units 13 will diminish accordingly in successive units from the lowest unit to that which is uppermost.

To enhance the comfort of the seat-back, local regions thereof may have greater firmness than other regions thereof. To this end the spring units 13 are provided in wire of different gauges, the units at the bottom of the back being composed of heavier and stiffer wire than the remainder of the units. For example, in the illustrative embodiment of the invention shown herein, the wire of the four lowermost units is 9 gauge (.148" dia.), whereas the wire of the remaining units is 11 gauge (.120" dia.). Obviously the gauge of the wire and the arrangement of the spring units may be varied to suit different conditions.

Bonded to the front textile ply 15 is a flat layer 18 of molded cellular or foam rubber composition, and bonded to the rear textile ply 16 is a layer 19 of similar foam rubber composition. The layers 18, 19 are of the same shape and area. Both layers 18 and 19 are relatively thin as compared to the padding of conventional seat backs, the layer 18 being about ¾ inch thick and the layer 19 being about ¼ inch thick.

Bonded to the back of layer 19, along the top and lateral margins thereof is a vulcanized rubber strip 22 that facilitates attaching of the seat back to the supporting structure 10. The latter may be of a metal channel as shown, or it may be an angle iron. The strip 22 is formed with a rearwardly opening longitudinally extending recess 24 in which a flange of the channel is received, and has a rib-like portion 25 arranged to fit between the flanges of the channel. The attaching strip 22 is of sufficient width to provide adequate area of attachment to the layer 19. Adhered to the latter is a back cover 26 of textile fabric, the marginal portion of which overlaps and conceals a portion of the attaching strip 22.

The resilient diaphragm portion 11 of the seat back is securely connected to the supporting channel 10 by means of the marginal portions of fabric ply 15 that project laterally of the diaphragm structure, said projecting portions being designated 28. Said portions 28 are brought around back of the channel 10, as shown, and attached to the back cover 24 by being adhered thereto, or in any other suitable manner.

It will be understood that the structure described may be covered with any suitable upholstery material (not shown), in view of the conditions of service of the seat.

The invention provides a seat back that readily shapes itself to the back of a seat-occupant, that is relatively thin so as to be available for use in situations where space is at a premium, and which achieves the other advantages set out in the foregoing statement of objects.

Modification may be resorted to without departing from the spirit of the invention, or the scope thereof as defined by the appended claims.

What is claimed is:

1. In a seat back of the character described, the combination of a marginal metal supporting frame, and a resilient diaphragm-like structure attached at its margin to said frame, said diaphragm structure comprising a plurality of parallel, transversely extending flat spring units that are free at both ends, plies of textile fabric arranged on opposite sides of the spring units and bonded to the latter and to each other to maintain said spring units fixedly in determinate relation to each other, and layers of resilient foam rubber composition bonded to the respective plies of textile fabric, said diaphragm-like structure including a molded rubber attaching strip bonded to its rear face at the margin thereof, said mounting strip being so shaped as to effect interfitting with the said supporting frame.

2. A combination as defined in claim 1 whereof one of the plies of textile fabric has marginal portions projecting beyond the lateral margins of the diaphragm structure, said projecting portions adapted for securing the diaphragm structure to the supporting frame.

3. In a seat back of the class described, including a marginal metal support frame, a resilient diaphragm-like structure comprising a series of transversely arranged flat wire springs in sinuous form that are free at both ends, opposed plies of rubberized textile fabric arranged on opposite sides of said springs and being bonded to the latter and to each other, said diaphragm-like structure being supported on said frame by the sole means of at least one ply of said fabric attached to said frame.

HYLAND C. FLINT.

REFERENCES CITED

The following references are of record in the file of this patent:

UNITED STATES PATENTS

| Number | Name | Date |
| --- | --- | --- |
| 122,798 | Bigeon | Jan. 16, 1872 |
| 1,206,073 | Young | Nov. 28, 1916 |
| 2,163,359 | Van Derveer | June 20, 1939 |
| 2,281,341 | Turner | Apr. 28, 1942 |